(12) United States Patent
Lee et al.

(10) Patent No.: US 11,113,130 B2
(45) Date of Patent: Sep. 7, 2021

(54) ELECTRONIC APPARATUS AND CONTROL METHOD THEREOF

(71) Applicant: Samsung Electronics Co., Ltd., Suwon-si (KR)

(72) Inventors: Somi Lee, Suwon-si (KR); Minhee Park, Suwon-si (KR); Hyosung Park, Suwon-si (KR); Myoungil Lee, Suwon-si (KR); Byulna Lee, Suwon-si (KR); Heejun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/788,985

(22) Filed: Feb. 12, 2020

(65) Prior Publication Data

US 2020/0257580 A1 Aug. 13, 2020

(30) Foreign Application Priority Data

Feb. 13, 2019 (KR) ........................ 10-2019-0016468

(51) Int. Cl.
*G06F 11/07* (2006.01)
*G06F 3/041* (2006.01)

(52) U.S. Cl.
CPC ........ *G06F 11/073* (2013.01); *G06F 11/0709* (2013.01); *G06F 11/0721* (2013.01); *G06F 3/0412* (2013.01); *G06F 11/0733* (2013.01)

(58) Field of Classification Search
CPC ............... G06F 11/073; G06F 11/0721; G06F 11/0709; G06F 3/0412; G06F 11/0733
See application file for complete search history.

(56) References Cited

U.S. PATENT DOCUMENTS

| | | | | |
|---|---|---|---|---|
| 2008/0082653 | A1* | 4/2008 | Huang | H04L 67/12 709/224 |
| 2017/0004065 | A1* | 1/2017 | Angwin | G06F 11/3636 |
| 2017/0371781 | A1* | 12/2017 | Choi | G06F 12/0246 |
| 2018/0278708 | A1* | 9/2018 | Ishihara | H04L 67/2852 |
| 2020/0174874 | A1* | 6/2020 | Yamada | G06F 11/0778 |

FOREIGN PATENT DOCUMENTS

| | | |
|---|---|---|
| KR | 10-2009-0071575 A | 7/2009 |
| KR | 10-2015-0116506 A | 10/2015 |

OTHER PUBLICATIONS

Park et al., "System and method for targeting a user terminal", Oct. 19, 2015, 14 pages. (Year: 2015).*

* cited by examiner

*Primary Examiner* — Arvin Eskandarnia
*Assistant Examiner* — Chhian (Amy) Ling
(74) *Attorney, Agent, or Firm* — Staas & Halsey LLP

(57) ABSTRACT

An electronic apparatus includes a memory; a communication circuitry configured to communicate with a server; and a processor configured to: control the communication circuitry to transmit error information about a first error, which occurs during an operation, to the server, based on the first error, receive information about data to be collected for solving a second error set based on the error information from the server, store the data generated during the operation based on the received information in the memory, and control the communication circuitry to transmit the stored data to the server, based on the second error which occurs during the operation.

17 Claims, 8 Drawing Sheets

FIG. 5

| DEVICE ID | MODE NAMEED | ERROR TYPE | USABLE MEMORY CAPACITY | APPLICATION ID | ... |
|---|---|---|---|---|---|
| FIRST DEVICE | A | ABNORMAL VIDEO OUTPUT | 3.65 | Vdplayer 2.0 | |
| SECOND DEVICE | B | ABNORMAL AUDIO OUTPUT | 3.05 | Audio decoder | |
| THIRD DEVICE | C | ABNORMAL AUDIO OUTPUT | 2.10 | Audio decoder | |
| FOURTH DEVICE | B | ABNORMAL VIDEO OUTPUT | 1.81 | Vdplayer 2.0 | |
| FIFTH DEVICE | A | ABNORMAL VIDEO OUTPUT | 3.65 | Vdplayer 1.5 | |
| ... | | | | | |

| ERROR TYPE | KINDS OF DEBUGGING DATA TO BE COLLECTED | ADDRESS OF DEBUGGING DATA TO BE COLLECTED | ... |
|---|---|---|---|
| ABNORMAL VIDEO OUTPUT | 1. VIDEO-RELATED LOGFILE | 1. THE WHOLE | ... |
| ABNORMAL AUDIO OUTPUT | 1. AUDIO CONNECTION INFORMATION<br>2. AN AUDIO-RELATED LOGFILE | 1. THE WHOLE<br>2. THE WHOLE | ... |
| TROUBLE WITH CLOSING APPLICATION | 1. APPLICATION ID INFORMATION<br>2. APPLICATION-RELATED LOGFILE | 1. THE WHOLE<br>2. MMM~ NNN, XXX ~ YYY | ... |
| ... | ... | ... | ... |

600

ELECTRONIC APPARATUS AND CONTROL METHOD THEREOF

CROSS-REFERENCE TO RELATED THE APPLICATION

This application is based on and claims priority under 35 U.S.C. § 119 to Korean Patent Application No. 10-2019-0016468 filed on Feb. 13, 2019 in the Korean Intellectual Property Office, the disclosure of which is incorporated by reference herein in its entirety.

BACKGROUND

Field

The disclosure relates to an electronic apparatus that executes processes based on various applications to perform a user's desired function and a control method thereof, and more particularly to an electronic apparatus and a control method thereof, in which an error in a process is solved by transmitting information about the error to a management server when the error occurs.

Description of the Related Art

To compute and process predetermined information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image data; an audio apparatus for audio process; home appliances for miscellaneous household chores; etc. The image processing apparatus may be embodied by a display apparatus that displays an image based on processed image data on its own display panel. Such various kinds of electronic apparatuses may respectively serve as a server and a client which can communicate with each other.

A manufacturer of an electronic apparatus builds an application platform to be driven in various kinds or models of electronic apparatuses. In a case of an open platform, many companies and developers create applications executable on the platform and provide the applications to be run in the electronic apparatus. However, as the number of applications increases and the kinds of applications become diverse, an error unexpectable when the manufacturer creates and provides the platform for the first time may occur while the application is run in the electronic apparatus. To cope with such an error, the manufacturer collects information about errors from many electronic apparatuses through a management server, and debugs the application based on the collected information, thereby investigating the causes of the errors. The manufacturer takes a countermeasure of modifying the application based on the investigated causes, etc. and provides the countermeasure to the electronic apparatus.

Meanwhile, according to the kinds or models of electronic apparatuses, there is an electronic apparatus of which memory capacity is not enough to store all pieces of information about the error that occurs in running the application. In this regard, the electronic apparatus typically sends only a preset small amount of information to a server when the error occurs in the process of the application. For example, when the process with the error includes a plurality of threads, the electronic apparatus sends only information about a main thread to the server.

However, the process is implemented as a plurality of threads are associated with each other and or executed in sequence or all together, and therefore the error in the process may be caused by not one thread but an associated operation of many threads. In this case, only the information about the main thread collected through the server is not enough for the developer to find the cause of the error in the process. Of course, it is possible to investigate the error thoroughly if the electronic apparatus transmits information about all the threads of the process, but it may be difficult for the electronic apparatus to do such operation according to apparatus characteristics as described above. Further, it may also be burdensome for the server to receive an enormous amount of error information from all the connected electronic apparatuses.

In this regard, there needs a method of collecting pieces of information enough to clearly investigate a cause of an error, while reducing the amount of information related to the error collected from many electronic apparatuses by the server.

SUMMARY

According to an embodiment of the disclosure of the present disclosure, there is provided an electronic apparatus including: a memory; a communicator configured to communicate with a server; and a processor configured to: control the communicator to transmit error information about a first error, which occurs during an operation, to the server, control the communicator to receive information about data to be collected for solving a second error which occurs based on the error information transmitted to the server, from the server, store the data generated during the operation based on the received information in the memory, and control the communicator to transmit the stored data to the server, based on the second error.

The data to be collected for solving the second error may be set based on the error information transmitted from the electronic apparatus to the server, and error information collected from a plurality of other electronic apparatuses by the server.

The second error may include an error, which occurs the greatest number of times, among errors reported in the error information collected from the electronic apparatus and the error information collected from the plurality of other electronic apparatuses.

The processor may receive the information based on the memory including a usable capacity of storing the data to be collected for solving the second error higher than a threshold usable memory capacity.

The processor may transmit information about the usable capacity of the memory to the server, so that the server selectively transmits information about the data to be collected based on the usable capacity of the memory.

The first error may be identical to the second error.

According to an embodiment of the disclosure of the present disclosure, there is provided a method of controlling an electronic apparatus, including: transmitting error information about a first error, which occurs during an operation, to a server; receiving information about data to be collected for solving a second error which occurs based on the error information transmitted to the server, from the server; storing the data generated during the operation based on the received information in a memory; and transmitting the stored data to the server, based on the second error.

According to an embodiment of the disclosure of the present disclosure, there is provided a server including: a communicator configured to communicate with a plurality of terminals; and a processor configured to: select an error based on error information about an error, which occurs during an operation, collected from the plurality of terminals, select one or more terminals among the terminals which reported the error information about the selected error, control the communicator to transmit information about data to be collected for solving the selected error to the selected one or more terminals, and collect the data generated based on the transmitted information from the selected one or more terminals.

BRIEF DESCRIPTION OF THE DRAWINGS

The above and/or other aspects will become apparent and more readily appreciated from the following description of embodiments, taken in conjunction with the accompanying drawings, in which:

FIG. 5 illustrates some pieces of error information corresponding to terminals collected from the terminals by a server according to an embodiment of the disclosure;

FIG. 6 illustrates some pieces of policy information provided in a server according to an embodiment of the disclosure;

DETAILED DESCRIPTION OF EMBODIMENTS

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
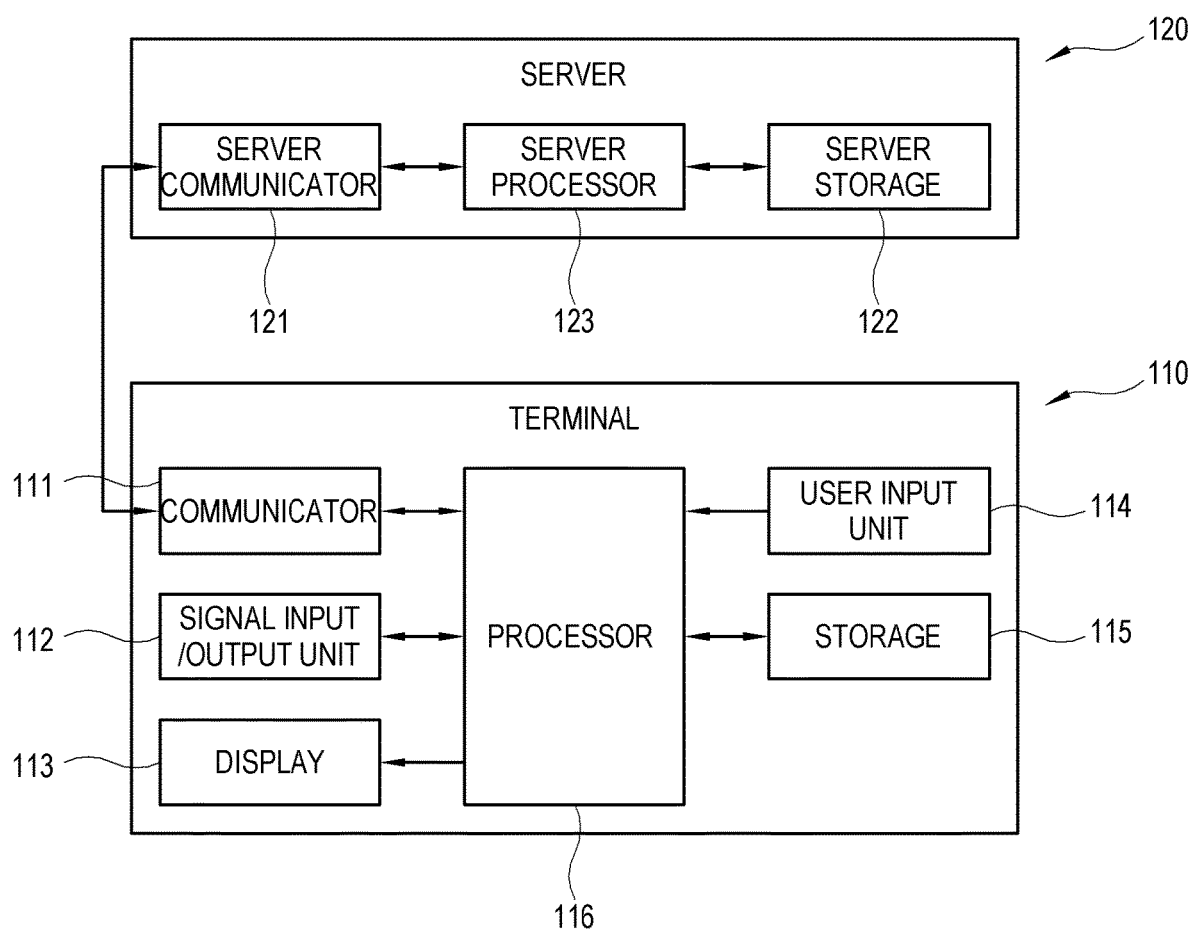
FIG. 1 is a block diagram of an electronic apparatus according to an embodiment of the disclosure.

FIG. 1 is a block diagram of an electronic apparatus according to an embodiment of the disclosure.

As shown in FIG. 1, a system according to an embodiment of the disclosure includes a plurality of terminals 110, and a server 120 connecting and communicating with each terminal 110 through a network. The electronic apparatus according to an embodiment may be embodied by one of the server 120 and the terminal 110. A connection method between the server 120 and the terminal 110 may include a wide area network, a local area network, a one-to-many connection based on a cable, etc. It is merely an example that the system includes the server 120. Alternatively, the server 120 may be replaced by a host apparatus that connects and communicates with various terminals 110. The terminal 110 may be embodied by various apparatuses such as a display apparatus, an image processing apparatus, home appliances, an information processing apparatus, etc. For example, the terminal 110 includes a television (TV), a computer, a set-top box, a tablet computer, a portable media player, and a wearable device, etc.

The terminal 110 implements one or more processes by driving an application program on an OS. The terminal 110 may implement multi-processes, i.e. may run a plurality of processes at a certain point in time. The terminal 110 transmits error information about an error in a corresponding process to the server 120 when the error occurs in one or more running processes.

The server 120 may be embodied by not only a single apparatus like this embodiment, but also a plurality of apparatus grouped according to functions. The server 120 collects the error information about the error in the process, which occurs in the terminal 110, from the connected terminals 110. Based on such error information of the terminal 110 collected in the server 120, a developer investigates the cause of the error and takes a countermeasure. For example, the developer modifies an application not to generate an error in the process, and stores the modified application in the server 120. The server 120 provides the modified application to the terminals 110, and each terminal 110 updates a previously stored application with the provided application and thus copes with the error.

The terminal 110 includes a communicator 111, a signal input/output unit 112, a display 113, a user input unit 114, a storage 115, and a processor 116. The server 120 includes a server communicator 121, a server storage 122, and a server processor 123.

Below, a configuration of the terminal 110 will be described. Although this embodiment describes that the terminal 110 is a display apparatus, the terminal 110 may be embodied by various electronic apparatuses. Therefore, this embodiment does not limit the configuration of the terminal 110.

The communicator 111, including communication circuitry, refers to an interactive communication circuit that includes at least one of elements, such as a communication module, a communication chip, etc. corresponding to various wired and wireless communication protocols. For example, the communicator 111 may be embodied by a wireless communication module configured to perform wireless communication with an access point (AP) through Wi-Fi, or a local area network (LAN) card connected to a router or a gateway by a wire. For example, the communicator 111 may communicate with a server 120 on a network, thereby exchanging a data packet with the server 120.

The signal input/output unit 112 is one-to-one or one-to-many connected to an external apparatus such as a set-top box or an optical media player by a cable, thereby receiving or outputting data from and to the corresponding external apparatus. The signal input/output unit 112 may for example include a high definition multimedia interface (HDMI) port, a display port, a universal serial bus (USB) port, and the like connectors or ports according to preset transmission standards.

The display 113 includes a display panel capable of displaying an image on a screen. The display panel is provided to have a light receiving structure such as a liquid crystal type, or a self-emissive structure such as an organic light emitting diode (OLED) type. The display 113 may include an additional element according to the structures of the display panel. For example, when the display panel is the liquid crystal type, the display 113 includes a liquid crystal display panel, a backlight unit configured to emit light, and a panel driving substrate configured to drive liquid crystal of the liquid crystal display panel.

The user input unit 114 includes circuitry related to various input interfaces provided to be controlled by a user to make an input. The user input unit 114 may be variously configured according to the kinds of terminal 110, and may for example include a mechanical or electronic button of the terminal 110, a remote controller separated from the terminal 110, a touch pad, a touch screen installed in the display 140, etc.

The storage 115 is accessed by the processor 116, and performs operations such as reading, recording, modifying, deleting, updating, etc. for data under control of the processor 116. The storage 115 includes a flash memory, a hard disk drive (HDD), a solid state drive (SSD), a read only memory (ROM), and the like nonvolatile memory in which data is retained regardless of whether power is supplied or not; and a buffer, a random access memory (RAM) and the like volatile memory to which processing data is loaded. In this embodiment, the storage 115 is configured to store an OS, and various applications provided to run on the OS.

The processor 116 includes one or more hardware processors achieved by a central processing unit (CPU), a chipset, a buffer, a circuit, etc. which are mounted on a printed circuit board (PCB). Alternatively, the processor 116 may be designed as a system on chip (SoC). The processor 116 includes modules corresponding to various processes, such as a demultiplexer, a decoder, a scaler, an audio digital signal processor (DSP), an amplifier, etc. when the terminal 110 is embodied as the display apparatus. Among such modules, some or all of the modules may be achieved by the SoC. For example, a demultiplexer, a decoder, a scaler, and the like module related to an image process may be achieved as an image processing SoC, and an audio DSP may be achieved as a chipset separated from the SoC.

The processor 116 starts the OS when booted up, and drives one or more applications to run on the OS in response to various events, thereby implementing a process based on each application. However, an error may occur in a certain process while the processor 116 implements one or more processes. In this case, the processor 116 identifies the process in which the error occurred, and transmits information about the error of the identified process to the server 120 through the communicator 111.

Below, a configuration of the server 120 will be described.

The server communicator 121, including communication circuitry, refers to an interactive communication circuit that includes at least one of elements, such as a communication module, a communication chip, etc. corresponding to various wired and wireless communication protocols. The server communicator 121 is connected to a wide area network (WAN), thereby communicating with various clients such as the terminal 110.

The server storage 122 performs operations such as reading, recording, modifying, deleting, updating, etc. for data by the server processor 123. The server storage 122 includes a flash memory, an HDD, an SSD, a buffer, a RAM, and the like nonvolatile and volatile memories.

The server processor 123 may include one or more hardware processors embodied by a CPU, a chipset, a buffer, a circuit, etc. which are mounted on a PCB, and may also be designed as an SoC. The server processor 123 may perform various processes based on information received from the terminal 110. For example, when error information about an error in a process is received from many terminals 110 through the server communicator 121, the server processor 123 performs an error collection process based on the received error information. The error collection process is performed by associated operation between the server 120 and the plurality of terminals 110. Below, the error collection process will be described.

Figure 2:
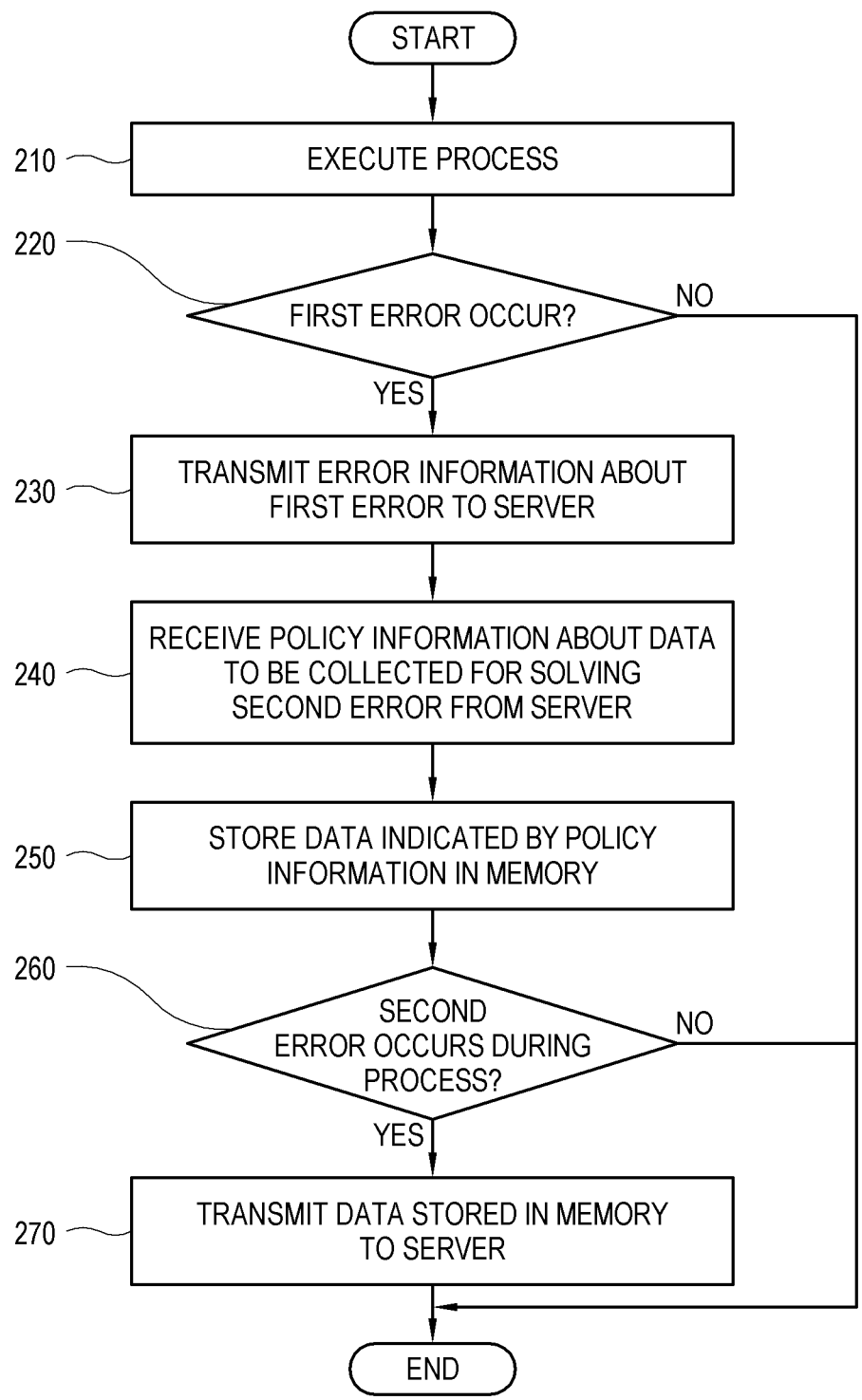
FIG. 2 is a flowchart showing a method of controlling a terminal according to an embodiment of the disclosure.

FIG. 2 is a flowchart showing a method of controlling a terminal according to an embodiment of the disclosure.

As shown in FIG. 2, the following operations are carried out by a processor of a certain terminal. Further, the terminal performing the following operations includes at least one among a plurality of terminals connecting and communicating with the server. In other words, each of the plurality of terminals may perform the following operation.

At operation 210 the terminal executes the process. The terminal may for example implement the process by executing an application stored in the storage, and may run a plurality of processes at a time.

At operation 220 the terminal detects whether a first error occurs in the process while the process is running. When the first error does not occur, the terminal continues to run the process without an additional operation.

On the other hand, when it is detected that the first error occurs, at operation 230 the terminal transmits error information about the first error to the server. Basically, the error information includes various pieces of information provided to identify a specific error among various kinds of errors previously defined in the server.

At operation 240 the terminal receives policy information about data to be collected for solving second error from the server. The policy information is previously defined based on error information collected from other terminals in addition to the error information transmitted from the terminal to the server. The second error may be the same as or different from the first error. The error information and the policy information will be described later in detail.

At operation 250 the terminal stores the data indicated by the policy information in the memory.

At operation 260 the terminal detects whether the second error occurs while the process is running again. When the second error does not occur, the terminal continues to run the process without an additional operation.

On the other hand, when it is detected that the second error occurs, at operation 270 the terminal transmits the data stored in the memory to the server.

The foregoing operations based on the error collection process may be carried out by each of the plurality of terminals connected to the server. However, the operations subsequent to the operation 240 are performed by not all the plurality of terminals but some terminals selected by the server. That is, the terminals, which receive the policy information, correspond to some selected by the server among the plurality of terminals.

Below, it will be described that the error collection process is performed in not a certain terminal but the whole system, i.e. between the server and the plurality of terminals.

Figure 3:
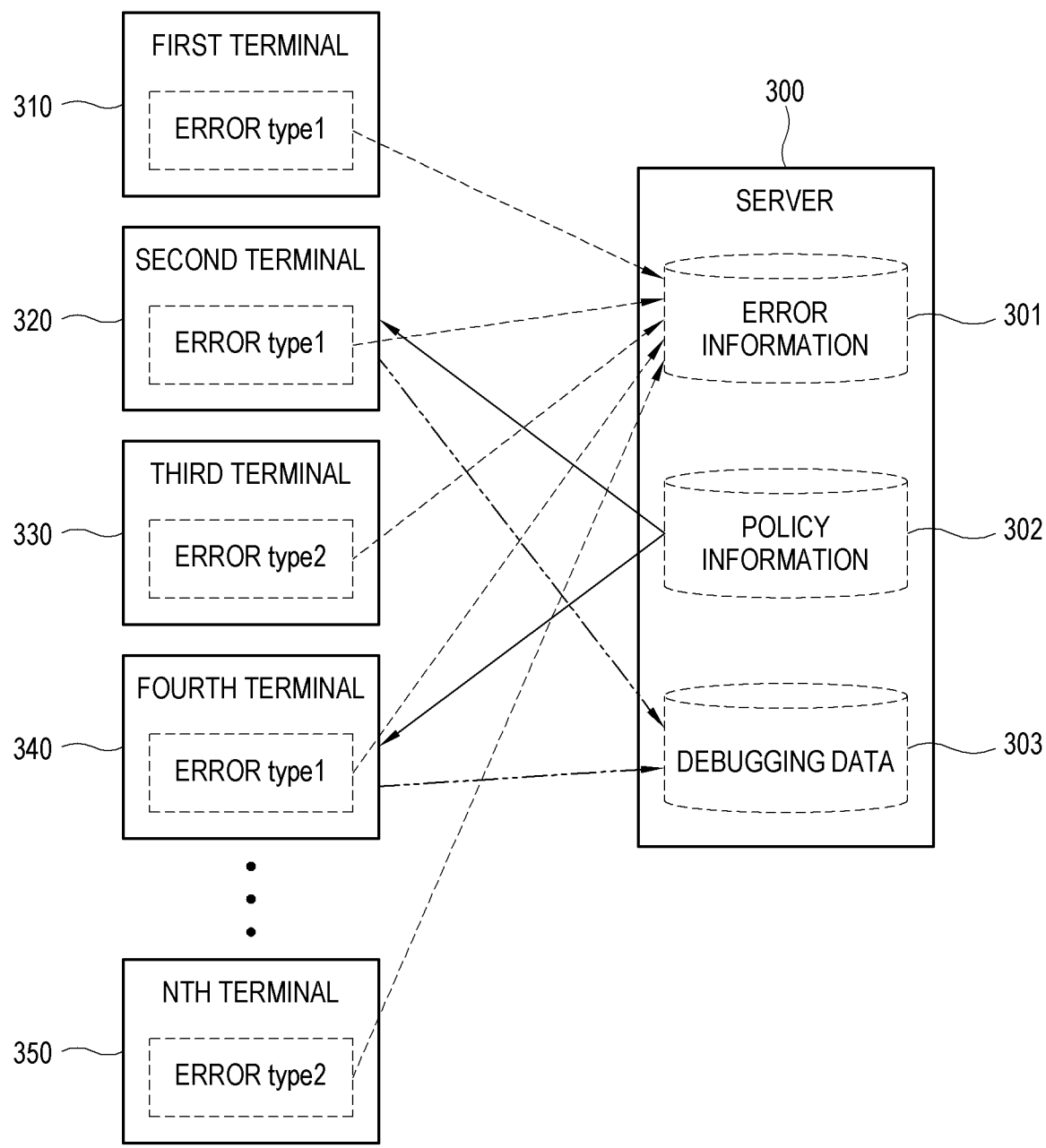
FIG. 3 illustrates a process performed for collecting error information between a server and a plurality of terminals according to an embodiment of the disclosure.

FIG. 3 illustrates a process performed for collecting error information between a server and a plurality of terminals according to an embodiment of the disclosure.

As shown in FIG. 3, a server 300 connects and communicates with a plurality of terminals 310, 320, 330, 340 and 350. N terminals 310, 320, 330, 340 and 350 (where, N is a natural number greater than one) each implement one or more processes, and transmits error information 301 about an error to the server 300 when the error occurs in the process. The error information 301 transmitted from each terminal 310, 320, 330, 340 or 350 to the server 300 indicates a type of error generated at least in the corresponding terminal 310, 320, 330, 340 or 350. The processes performed in the terminals 310, 320, 330, 340 and 350 may be different, and the types of errors that occur in the terminals 310, 320, 330, 340 and 350 may be different even though the identical processes are performed.

The error information 301 includes information about kind or identification information about the terminal 310, 320, 330, 340 or 350; kind or identification information about an application or process which contains an error; information about use environments of the terminal 310, 320, 330, 340 or 350; information about a type of error that occurred in the process, etc. Thus, the server 300 identifies the type of error that occurs in the terminals 310, 320, 330, 340 and 350, based on the error information 301.

The server 300 collects the error information 301 received from each individual terminal 310, 320, 330, 340 or 350. The server 300 selects the type of error, which occurred the most, among the errors, based on the collected error information 301. For example, when the type of error, which occurred the most, among the errors is a "type1", the server 300 selects the terminals 310, 320 and 340, which reported the "type1" of error, among the terminals 310, 320, 330, 340 and 350 which transmit the error information 301.

The server 300 obtains policy information 302 corresponding to the "type1" of error among pieces of previously provided policy information 302. The policy information 302 refers to information that indicates data to be collected from the process according to the types of error generated while the process is running. For example, the policy information 302 is provided to indicate data which is identified as needed for the developer to debug the application. The location of the data indicated by the policy information 302 may be given in various forms, for example, a code address of the application for executing the process, identification information of a thread in the process, etc.

The server 300 selects the terminals 320 and 340, which satisfy a preset condition, among the terminals 310, 320 and 340 corresponding to the "type1" of error. There may be various preset conditions. Only one condition may be applied, or two or more conditions may be applied according to priorities. For example, such conditions may include usable capacities in memories of the terminals 310, 320 and 340; the kinds or models of terminals 310, 320 and 340 in which the selected type of error occurred the most; a network state between the server 300 and the terminals 310, 320 and 340; performance of the processors in the terminals 310, 320 and 340; etc. Details of such conditions will be described later.

For example, the server 300 selects the terminals 320 and 340, of which the usable memory capacities are higher than a threshold, among the selected terminals 310, 320 and 340 corresponding to the "type1" of error. The server 300 transmits the policy information 302 matching the "type1" of error to the selected terminals 320 and 340.

The terminals 320 and 340 receive the policy information 302 from the server 300, and store the policy information 302. The policy information 302 is valid for a preset period of time, for example, for three days, and thereafter becomes invalid. The terminals 320 and 340 collect debugging data 303 for debugging the corresponding error as instructed by the policy information 302 and store the debugging data 303 in the memory. To select the terminals 320 and 340, of which the usable capacities of the memories are enough to store the debugging data 303 indicated by the policy information 302, the server 300 previously identifies whether the usable capacities of the memories in the terminals 310, 320 and 340 are higher than the threshold.

The terminals 320 and 340 monitor whether the indicated error occurs, in the process indicated in the policy information 302. When the indicated error occurs, the terminals 320 and 340 transmit the debugging data 303 for debugging the corresponding error, which is stored in the memory, to the server 300.

When the terminals 320 and 340 transmit the debugging data 303 stored in the memory to the server 300, the server 300 provides the debugging data 303 collected from the terminals 320 and 340 to the developer, thereby debugging the process.

Like this, the server 300 specifies an error that needs to be solved by priority, and receives the debugging data 303 required for solving the error from not all the terminals 310, 320, 330, 340 and 350 but some terminals 320 and 340.

Therefore, according to an embodiment, duplicate information is minimized to thereby solve traffic and memory problems. According to an embodiment, an error to be debugged is selectively identified, and a terminal from which data is collected is selected, thereby decreasing a total amount of collection data and increasing valid collection data.

The server 300 sufficiently collects information about problem-reproduction environments and scenarios from the sampling terminals 320 and 340 to collect the debugging data 303 based on the policy information 302, and therefore readily and rapidly copes with a problem.

Further, the different kinds of debugging data 303 are required for analysis and a solution according to the types of error. The server 300 in this embodiment collects the debugging data 303 by sampling the apparatuses according to the types of errors, and thus focuses on collecting the required debugging data 303.

Further, according to an embodiment, costs of operating the server 300 are reduced as duplicate data filtering is maximized, and a problem-solving rate increases with a lot of information about a problem.

Below, a control method related to operations of a server will be described.

Figure 4:
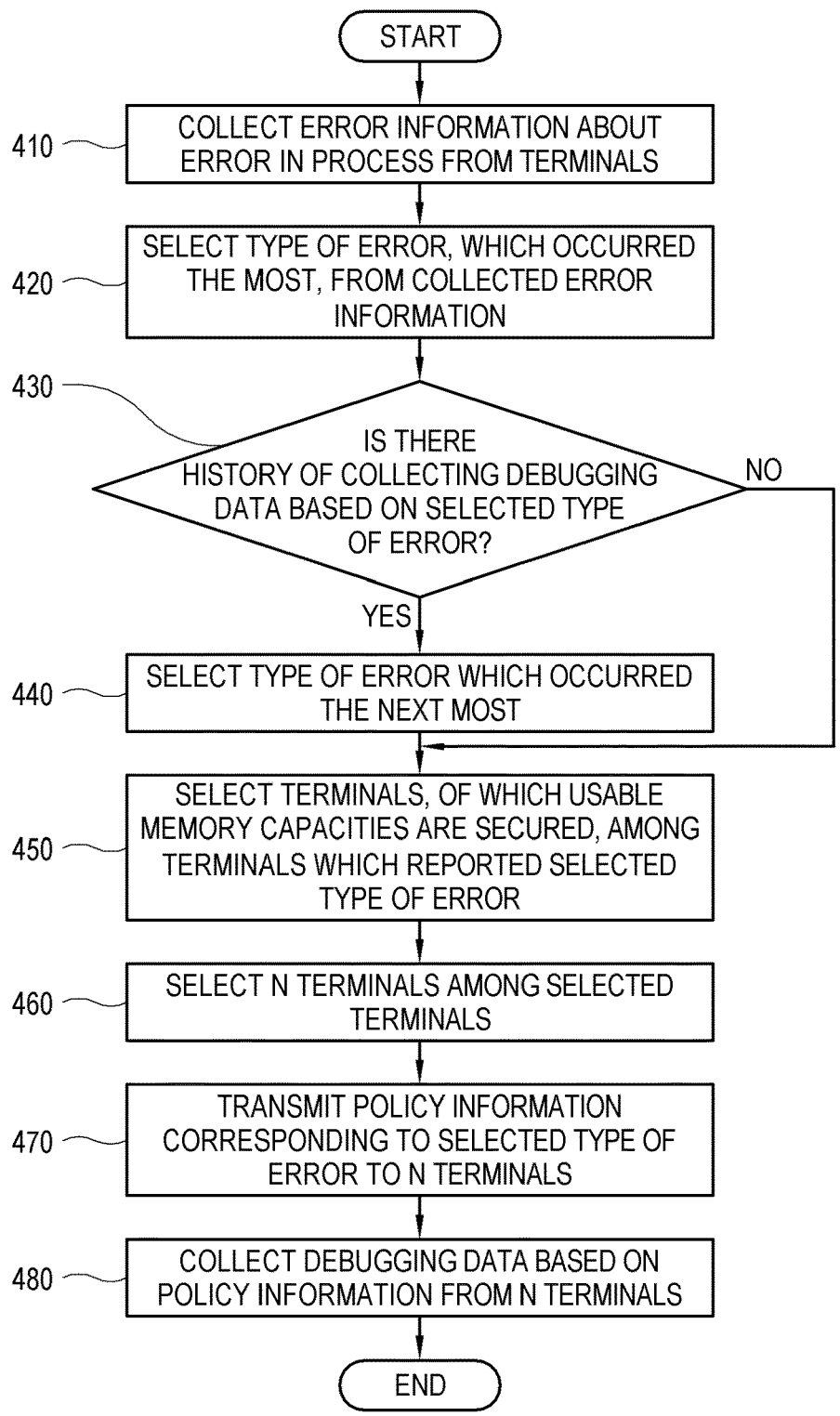
FIG. 4 is a flowchart showing a method of controlling a server according to an embodiment of the disclosure.

FIG. 4 is a flowchart showing a method of controlling a server according to an embodiment of the disclosure.

As shown in FIG. 4, the following operations are performed by the processor of the server.

At operation 410 the server collects error information about an error in a process, which occurs in terminals, from a plurality of corresponding terminals.

At operation 420 the server selects a type of error, which occurred the most, among types of errors reported in the collected error information.

At operation 430 the server identifies whether there is a history of collecting debugging information based on policy information corresponding to the selected type of error, within a predetermined period of time from a current point in time.

When there is a history of collection, at operation 440 the server selects a type of error, which occurs the next most. When there is no history of collection, the server enters the next operation.

At operation 450 the server selects terminals, of which usable capacities of memories are secured, i.e. the usable capacities of the memories are higher than a threshold, among the terminals which reported the selected type of error. When the usable capacities of the memories in the corresponding terminals are included in the error information collected from the terminals, the server may identify the usable capacities of the memories in the terminals based on the error information. Alternatively, the server may transmit a request for information about the usable capacities of the memories to the terminals which reported the selected types of errors, and receive the requested information from the terminals.

At operation 460 the server selects N terminals based on preset criteria among the terminals of which the usable capacities of the memories are secured. Here, N is a preset natural number, and the criteria for selecting the terminals will be described later. Meanwhile, in this embodiment, the operation 450 is performed before the operation 460. Alternatively, the operation 460 may be designed to precede the operation 450, or only the operation 450 may be performed without the operation 460.

At operation 470 the server transmits the policy information corresponding to the selected type of error to N selected terminals.

At operation 480 the server collects debugging data obtained as instructed by the policy information, from N terminals to which the policy information is transmitted.

Like this, the server efficiently collects the debugging data, which is needed for solving the error, from relatively fewer terminals, thereby saving network resources and sever resources.

Below, an example of the error information will be described.

FIG. 5 illustrates some pieces of error information corresponding to terminals collected from the terminals by a server according to an embodiment of the disclosure.

As shown in FIG. 5, when error information is received from the terminals, the server makes a list or database (DB) of the error information 500 collected from the terminals. The error information received from the terminals may for example include information such as device identification (ID) for identifying the terminals, a model name of indicating the kind or model of terminal, the type of error occurred in the terminal, the usable memory capacity of the terminal, processor ID, application ID, etc. Here, the information about the usable memory capacity of the terminal may be included in the error information 500. However, without being limited to this description, the information about the usable memory capacity of the terminal may be periodically or aperiodically reported to the server separately from the error information 500.

The server specifies the type of error, which is required for collecting the debugging information, in the collected error information 500. Basically, the server selects the type of error reported the most from the terminals. When the selected type of error has already been processed within a preset period of time and there is a history of collecting the debugging information, the server may select the type of error reported the next most.

For example, when an "abnormal video output" has been reported the most as the type of error, the server selects device ID, to which the policy information will be transmitted, among pieces of the device ID (refer to the first device, the fourth device, the fifth device, etc. in FIG. 5) which reported the "abnormal video output" as the type of error.

In the collected error information 500, the usable memory capacity refers to capacity for storing the debugging data indicated by the policy information. When the usable memory capacity is not higher than a threshold, it means that the terminal does not secure a memory enough to store the debugging data indicated by the policy information. When the threshold is given as '3,' the server selects the first device and the fifth device, of which the usable memory capacities are higher than '3,' as the terminal, to which the policy information will be transmitted, among the terminals which reported the "abnormal video output"

When it is identified that a relatively great number of terminals is selected, the server may use an additional criterion to reduce the number of terminals to which the policy information will be transmitted. For example, when the model of the most terminals which reported the "abnormal video output" is 'A,' the terminals corresponding to the model A in the preceding selection results are subjected to reselection. Alternatively, when the application ID, in which the error of "abnormal video output" occurs the most, is "Vdplayer 2.0," the device ID of the terminals which reported that the error occurred in "Vdplayer 2.0" may be reselected in the preceding selection results.

In terms of selecting the terminal to which the policy information will be transmitted, the server may select a terminal of which a usable capacity of a memory is higher than a threshold, the kind of model of terminal in which a selected type of error occurred the most, a terminal of which a speed of transmitting and receiving data is faster than a threshold, a terminal in which performance of a processor is relatively good, etc. Besides, various criteria may be used in selecting a terminal.

When the terminal is selected as above, the server transmits the policy information to the selected terminal, thereby collecting the debugging data from the selected terminals in the future.

Below, an example of the policy information will be described.

FIG. 6 illustrates some pieces of policy information provided in a server according to an embodiment of the disclosure.

As shown in FIG. 6, the server stores policy information 600 which indicates debugging data to be collected corresponding to various types of error. The policy information 600 indicates the kind or ID of debugging data to be collected in relation to a certain type of error when the certain type of error occurs. For example, the policy information 600 gives an instruction to collect a video-related logfile with respect to the type of error corresponding to the "abnormal video output," an instruction to collect audio connection information and an audio-related logfile with respect to the type of error corresponding to the "abnormal audio output," and an instruction to collect application ID information and an application-related logfile with respect to the type of error corresponding to a "trouble with closing an application."

When such policy information 600 is received from the server, the terminal stores the debugging data, which is related to the error indicated by the policy information 600, in the memory. Then, the terminal monitors whether an error having the same type as the error indicated by the policy information 600 occurs. For example, the error indicated by the policy information 600 may correspond to the "abnormal video output", and the related debugging data may be a video-related logfile. The terminal may obtain a video-related logfile as indicated by the policy information 600 and store the obtained video-related logfile in the memory, and transmits the video-related logfile stored in the memory as the debugging data to the server when the error of the "abnormal video output" occurs.

That is, the terminal continuously stores the video-related logfile, which is indicated by the policy information 600, in the memory during operation. The policy information 600 specifies a logfile needed for debugging a video-related error, and the terminal records a logfile during a certain operation corresponding to the logfile. The size of logfile to be recorded may be greater than that needed for debugging the error. The policy information 600 may specify the size of logfile to be transmitted when an error occurs. The terminal checks the size of logfile to be transmitted as indicated by the policy information 600, and allocates an area of the memory to store the logfile. The allocated area of the memory for the logfile is greater than the size of logfile to be transmitted. The terminal records a logfile in the corresponding area of the memory during operation, and updates the logfile in the corresponding area with new data when the recorded area is fully filled with data. When the corresponding error occurs, the terminal transmits the logfile, which is stored in the corresponding area at a point in time when the error occurs, to the server. In this case, the size of logfile to be transmitted may correspond to a size indicated by the policy information 600, and the terminal may set the debugging data based on data of the indicated size within the data of the logfile previously recorded with respect to a point in time when the error occurs.

Meanwhile, the policy information 600 may additionally indicate an address of a part obtained as the debugging data within the debugging data to be collected. The debugging data to be collected for the type of error corresponding to the "abnormal video output" is the video-related logfile, and the policy information 600 indicates the "whole" address of the debugging data to be collected. In this case, the terminal obtains the whole video-related logfile as the debugging data. Alternatively, in a case of the type of error corresponding to the "trouble with closing an application," the policy information 600 indicates the "whole" address for the application ID information, a specific part address for the application-related logfile. In this case, the terminal obtains the debugging data based on the whole application ID information, and data of an address indicated by the policy information 600 in the application-related logfile.

Like this, the terminal may obtain the debugging data based on the policy information 600 received from the server, and transmit the debugging data to the server.

As described above, according to an embodiment, the debugging data is transmitted from not all the plurality of terminals which reported a specific type of error to the server but some terminals selected by the server to the server based on the instructions of the policy information. Such an error typically occurs in many threads of a process. Below, an embodiment of the disclosure will be described with respect to usefulness in relation to the process and the thread.

Figure 7:
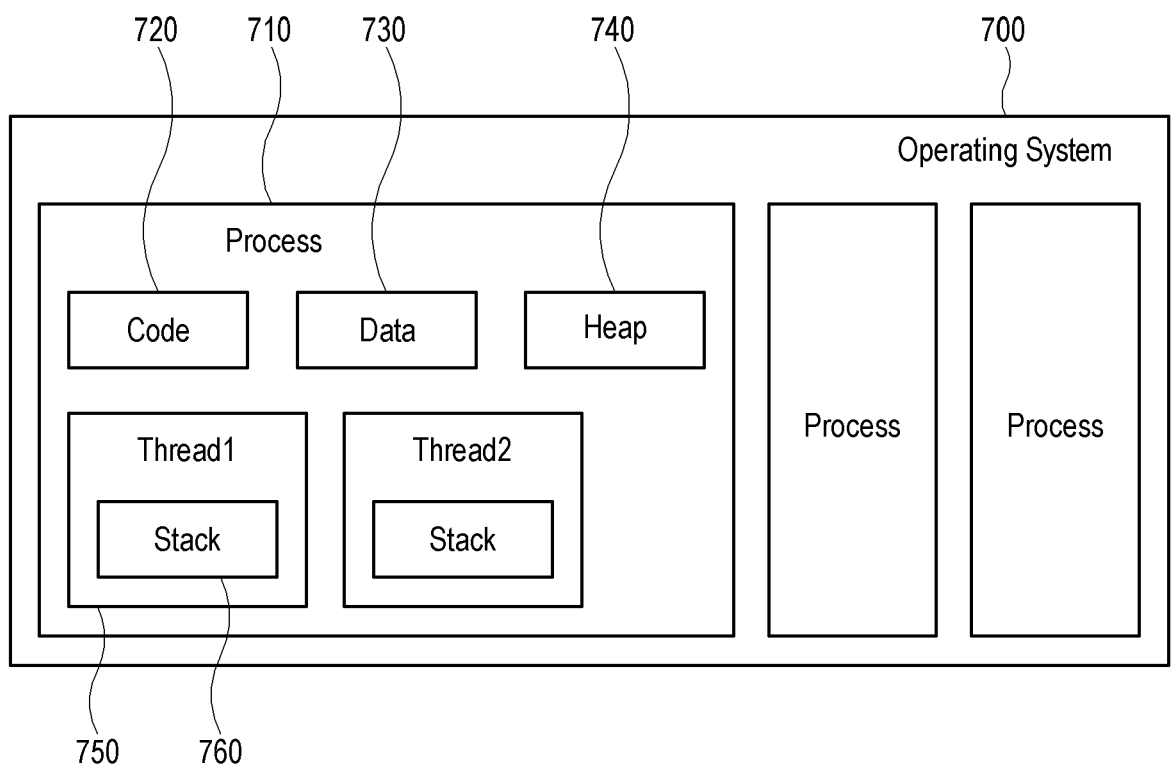
FIG. 7 is a block diagram showing a structure of processes implemented under an operating system (OS) of a terminal according to an embodiment of the disclosure.

FIG. 7 is a block diagram showing a structure of processes implemented under an OS of a terminal according to an embodiment of the disclosure.

As shown in FIG. 7, at least one process 710 is running under an OS 700 operating in a terminal. As an instance of an application typically driven under the OS 700 of the terminal, the process 710 refers to a unit of job to which system resources are allocated from the OS 700. The system resources may for example include independent memory areas structured to have an address space, a code 720, data 730, a stack 760, and a heap 740 which are required for allocating and running operations of a CPU or a processor.

The code 720 refers to a memory area in which a code of an application to be executed is stored. The processor of the terminal reads and processes an instruction stored in the code 720.

The data 730 refers to a memory area in which a global variable and a static variable of the application is stored. The data 730 is allocated along with the start of the application, and becomes extinct when the application is closed.

The stack 760 refers to a memory area in which a local variable and a parameter related to a function call are stored. The stack 760 is allocated along with the function call, and becomes extinct when the function call is completed. Information about the function call stored in the stack 760 will be called a stack frame.

The heap 740 refers to a memory area which is directly managed by a user. In the heap 40, a memory space is dynamically allocated or released by a user, in the allocation is achieved from a low memory address toward a high memory address.

The process 710 basically has one or more threads 750 as well as a main thread. Each process 710 runs in each individual address space, and one process 710 cannot access a variable or a data structure of another process. Inter-process communication (IPC) is needed for one process 710 to access resources of another process.

The thread 750 refers to a specific running path of the process 710 as a unit of many flows performed in the process 710, and corresponds to a unit of running in which the allocated resources is used by the process 710. In the process 710, the threads 750 are respectively allocated with only the stacks 760, and share the code 720, the data 730, and the heap 740. That is, when one thread 750 changes the resources, a result of the change is immediately shared to other sibling threads.

When an error occurs in the process 710, the error is unlikely to be caused by only one certain thread 750 because many threads 750 are executed as associated with each other in the process 710. The terminal uses a multi-thread method to implement the process. Because the memory areas except the stack 760 are shared among the threads 750, a certain thread 750 influences the other threads. Therefore, only information about a certain thread 750, for example, a main thread may be insufficient to debug an error that occurs in the process 710.

In a case of a terminal according to the related art, the terminal obtains and stores debugging data based on stack information about a preset thread, for example, a main thread when an error occurs, and transmits the stored debugging data to the server. A usable memory capacity is varied depending on the kind, model or use environments of the terminal, and thus a certain terminal may have a usable memory capacity insufficient to store the debugging data. Therefore, the terminal according to the related art obtains and transmits only the minimum debugging data to the server, but the minimum debugging data obtained as above may not be enough to investigate the cause of the error.

In such a conventional case, data actually needed for solving the error may be insufficient even though a lot of data is collected in the server through a network as many terminals connected to the server transmit the debugging data to the server.

On the other hand, according to an embodiment of the disclosure, the server transmits the policy information to sampling terminals among connected terminals when receiving error information from many terminals, and collects the debugging data based on the policy information from the sampling terminals. Therefore, according to an embodiment of the disclosure as compared with the related art, it is possible to focus on collecting the debugging data required for solving an error while reducing a total amount of data collected in the server.

The debugging data may for example include a logfile about an application as described above, or stack information of a specific thread. Alternatively, appended data may be included in the debugging data according to the kinds or characteristics of the process. For example, when an error occurs in an image reproducing process, the policy information may indicate image content data extracted in a section, in which an error occurs, of the whole image content data as the debugging data.

Meanwhile, the foregoing embodiment describes that one server performs all the operations. However, the operations may be divisionally performed by a plurality of servers, respectively. In this regard, an embodiment will be described below.

Figure 8:
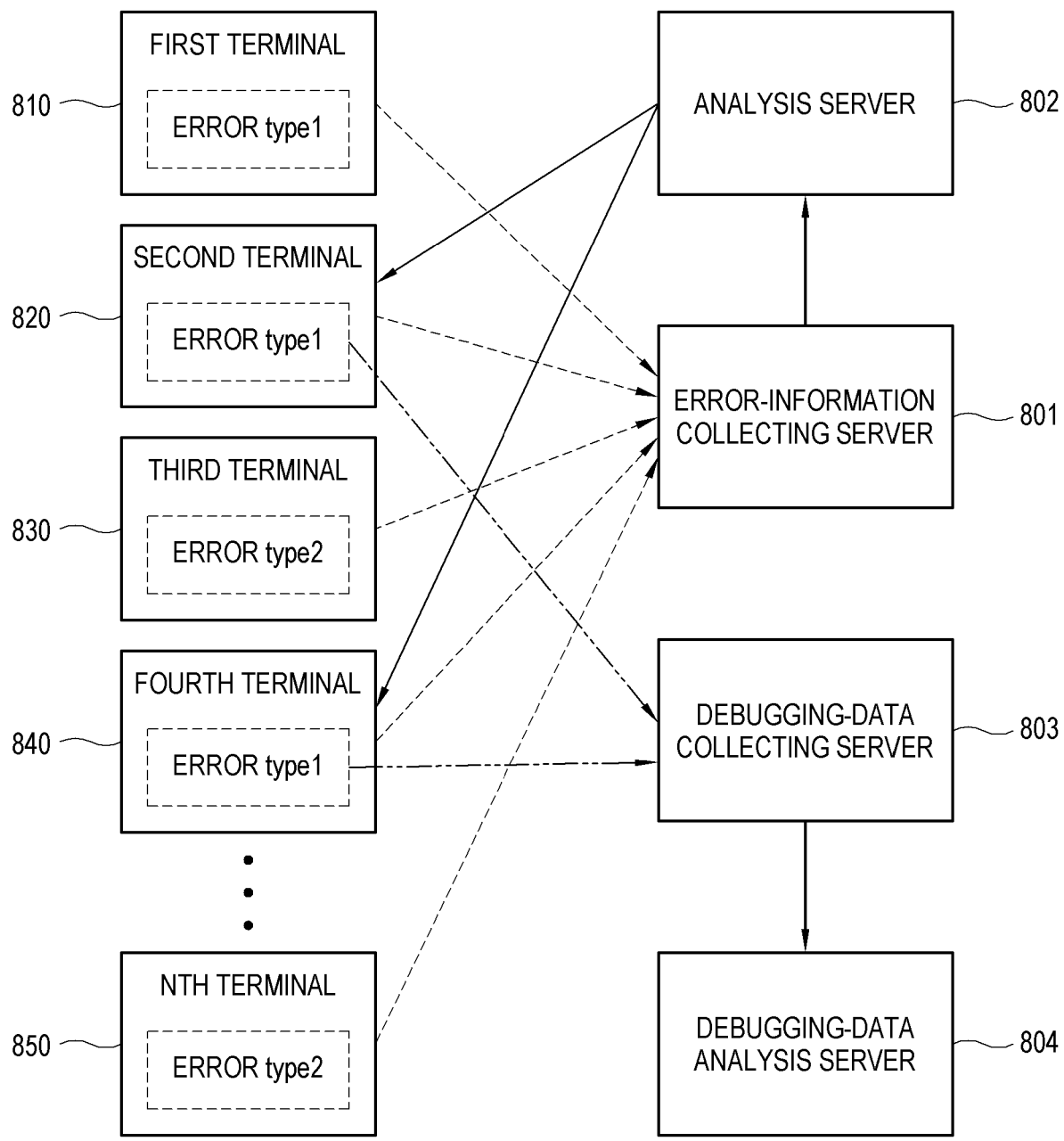
FIG. 8 illustrates a process performed for collecting error information by a plurality of servers according to an embodiment of the disclosure.

FIG. 8 illustrates a process performed for collecting error information by a plurality of servers according to an embodiment of the disclosure.

As shown in FIG. 8, a plurality of servers 801, 802, 803 and 804 connect and communicate with a plurality of terminals 810, 820, 830, 840 and 850. The plurality of servers 801, 802, 803 and 804 includes an error-information collecting server 801, an analysis server 802, a debugging-data collecting server 803, and a debugging-data analysis server 804 divided according to functions.

Each of the terminals 810, 820, 830, 840 and 850 implements one or more processes, and transmits error information about an error to the error-information collecting server 801 when the error occurs in the process. The error information transmitted from the terminals 810, 820, 830, 840 and 850 to the error-information collecting server 801 indicates a type of error generated at least in the corresponding terminals 810, 820, 830, 840 and 850.

The error-information collecting server 801 transmits such collected error information to the analysis server 802. The analysis server 802 identifies the type of error, which occurs in the terminals 810, 820, 830, 840 and 850, based on the received error information, and selects the type of error, which occurred the most. For example, the type of error, which occurred the most, among the errors in the collected error information is the "type1", the analysis server 802 selects the terminals 810, 820 and 840, which reported the "type1" of error, among many terminals 810, 820, 830, 840 and 850.

The analysis server 802 obtains policy information corresponding to the "type1" of error among pieces of previously provided policy information. The policy information 302 refers to information that indicates data to be collected from the process according to the types of error generated while the process is running. The policy information refers to information that indicates data to be collected from the process according to the types of error generated while the process is running. The policy information is provided to indicate data which is identified as needed for a developer to debug an application.

The analysis server 802 reselects the terminals 820 and 840, which satisfy a preset condition, among the terminals 810, 820 and 840 selected corresponding to the "type1" of error. There may be various preset conditions. Only one condition may be applied, or two or more conditions may be applied according to priorities. For example, such conditions may include usable capacities in memories of the terminals 810, 820 and 840; the kinds or models of terminals 810, 820 and 840 in which the selected type of error occurred the most; etc. For example, the analysis server 802 selects the terminals 820 and 840, of which the usable memory capacities are higher than a threshold, among the terminals 810, 820 and 840 selected corresponding to the "type1" of error. The server 800 transmits the policy information corresponding to the "type1" of error to the selected terminals 820 and 840.

The terminals 820 and 840 receive the policy information 802 from the analysis server 802, store the policy information, collect the debugging data for debugging the error indicated by the policy information, and store the collected debugging data in the memory. The terminals 820 and 840 monitor whether an error occurs in a process where the same error occurred corresponding to the policy information. When the same error occurs, the terminals 820 and 840 transmit the stored debugging data to the debugging-data collecting server 803.

The debugging-data collecting server 803 transmits debugging data 808 collected from the terminals 820 and 840 to the debugging-data analysis server 804, so that the process can be debugged.

Like this, the operations according to an embodiment of the disclosure may be divisionally shared among the plurality of server 801, 802, 803 and 804.

The operations of the apparatus described in the foregoing embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning (deep-running) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program command recorded in this storage medium may be specially designed and configured according to the embodiments, or may be publicly known and available to those skilled in the art of computer software.

Although a few embodiments have been shown and described, it will be appreciated by those skilled in the art that changes may be made in these embodiments without departing from the principles and spirit, the scope of which is defined in the appended claims and their equivalents.

What is claimed is:

1. An electronic apparatus comprising:
    a memory;
    a communication circuitry configured to communicate with a server; and
    a processor configured to:
        identify whether a first error occurs during a first operation performed by the processor;
        control, to the server, the communication circuitry to transmit error information about the identified first error;
        control, from the server, the communication circuitry to receive policy information indicating a data type to be collected to debug a second error which occurs during a second operation performed by the processor, the policy information being based on the error information transmitted to the server;
        collect data corresponding to the data type during the second operation;
        store the collected data the memory; and
        control, to the server, the communication circuitry to transmit the stored data.

2. The electronic apparatus according to claim 1, wherein the data to be collected to debug the second error is set based on the error information transmitted from the electronic apparatus to the server, and based on error information collected from a plurality of other electronic apparatuses by the server.

3. The electronic apparatus according to claim 2, wherein the second error comprises an error, which occurs the greatest number of times, among errors reported in the error information collected from the electronic apparatus and the error information collected from the plurality of other electronic apparatuses.

4. The electronic apparatus according to claim 1, wherein the processor receives the policy information based on the memory comprising a usable capacity, of storing the data to be collected to debug the second error, higher than a threshold usable memory capacity.

5. The electronic apparatus according to claim 4, wherein the processor transmits information about the usable capacity of the memory to the server, so that the server selectively transmits policy information about the data to be collected based on the usable capacity of the memory.

6. The electronic apparatus according to claim 1, wherein the first error is identical to the second error.

7. The electronic apparatus according to claim 1, wherein the policy information is defined based on error information collected from a plurality of other terminals in addition to the error information transmitted from the terminal.

8. A method of controlling an electronic apparatus, comprising:
    identifying whether a first error occurs during a first operation performed by a processor;
    transmitting error information about the identified first error to a server;
    receiving policy information indicating a data type to be collected to debug a second error which occurs during a second operation performed by the processor based on the error information transmitted to the server, from the server;
    collecting the data corresponding to the data type during the second operation;
    store the collected data in a memory; and
    transmitting the stored data to the server.

9. The method according to claim 8, wherein the data to be collected to debug the second error is set based on the error information transmitted from the electronic apparatus to the server, and based on error information collected from a plurality of other electronic apparatuses by the server.

10. The method according to claim 9, wherein the second error comprises an error, which occurs the greatest number of times, among errors reported in the error information collected from the electronic apparatus and the error information collected from the plurality of other electronic apparatuses.

11. The method according to claim 8, further comprising receiving the policy information based on the memory comprising a usable capacity, of storing the data to be collected to debug the second error, higher than a threshold usable memory capacity.

12. The method according to claim 11, further comprising transmitting information about the usable capacity of the memory to the server, so that the server selectively transmits policy information about the data to be collected based on the usable capacity of the memory.

13. The method according to claim 8, wherein the first error is identical to the second error.

14. A server comprising:
    a communication circuitry configured to communicate with a plurality of terminals; and
    a processor configured to:
        control the communication circuitry to receive error information about one or more errors occurred in the plurality of terminals from the plurality of terminals;

select an error which occurred the most among the one or more errors based on the received error information, select one or more terminals among the plurality of terminals which transmitted the error information about the selected error, control the communication circuitry to transmit policy information indicating a data type to be collected to debug the selected error to the selected one or more terminals, and collect data corresponding to the data from the selected one or more terminals.

15. The server according to claim 14, wherein the processor is configured to select the one or more terminals having a usable memory capacity of storing the data to be collected higher than a threshold usable memory capacity, respectively.

16. The server according to claim 15, wherein the processor is configured to selectively transmit the policy information about the data to be collected to the one or more terminals having a usable memory capacity of storing the data to be collected higher than a threshold usable memory capacity, respectively.

17. The server according to claim 14, wherein the selected error is identical to the one or more errors occurred in the plurality of terminals.

* * * * *